United States Patent
Palenius

(10) Patent No.: US 7,917,140 B2
(45) Date of Patent: Mar. 29, 2011

(54) INITIAL CELL SEARCH IN MOBILE COMMUNICATIONS SYSTEMS

(75) Inventor: Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1380 days.

(21) Appl. No.: 11/005,280

(22) Filed: Dec. 6, 2004

(65) Prior Publication Data

US 2008/0214174 A1 Sep. 4, 2008

(51) Int. Cl.
*H04W 4/00* (2009.01)

(52) U.S. Cl. ............ 455/434; 455/435.2; 455/450; 455/452.2; 455/422.1; 455/435.1; 455/436; 455/452.1; 455/437; 455/438; 455/439; 455/440; 455/441; 455/442

(58) Field of Classification Search ......... 455/435.2, 455/450, 452.2, 422.1, 434, 435.1, 436–442, 455/452.1
See application file for complete search history.

(56) References Cited

U.S. PATENT DOCUMENTS

| | | | |
|---|---|---|---|
| 6,205,193 B1 | 3/2001 | Solve et al. | |
| 6,615,043 B1* | 9/2003 | van de Berg | 455/434 |
| 7,013,140 B2 | 3/2006 | Ostberg et al. | |
| 7,079,569 B1* | 7/2006 | Hayata | 375/147 |
| 7,139,571 B1* | 11/2006 | Ishikawa et al. | 455/434 |
| 2002/0075833 A1 | 6/2002 | Dick et al. | |
| 2003/0031162 A1 | 2/2003 | Chitrapu et al. | |
| 2003/0031238 A1 | 2/2003 | Li et al. | |
| 2003/0095516 A1 | 5/2003 | Ok et al. | |
| 2004/0116110 A1* | 6/2004 | Amerga et al. | 455/422.1 |
| 2005/0043049 A1* | 2/2005 | Demir et al. | 455/513 |
| 2010/0091674 A1 | 4/2010 | Sjogren | |

FOREIGN PATENT DOCUMENTS

| | | |
|---|---|---|
| EP | 1 330 136 A1 | 7/2003 |
| WO | WO 03/063538 A1 | 7/2003 |

OTHER PUBLICATIONS

PCT International Search Report, dated Jun. 2, 2006, in connection with International Application No. PCT/EP2005/012984.
PCT Written Opinion, dated Jun. 2, 2006, in connection with International Application No. PCT/EP2005/012984.
International Preliminary Report on Patentability completed on May 25, 2007 in connection with International Application No. PCT/EP2005/012984.

* cited by examiner

*Primary Examiner* — Patrick N Edouard
*Assistant Examiner* — Shantell Heiber
(74) *Attorney, Agent, or Firm* — Potomac Patent Group PLLC

(57) ABSTRACT

An initial search for locating cells in a telecommunication system includes defining a set of carrier frequencies to be searched, and selecting as a cell search mode either a wide cell search mode or a narrow cell search mode, wherein selecting the cell search mode is based on a level of frequency generation accuracy. The wide cell search mode searches a wider frequency range than the narrow cell search mode searches. For each carrier frequency in the set of carrier frequencies to be searched, a most-recently selected cell search mode is used when searching for a cell transmitting on the carrier frequency. The narrow cell search mode is used only when the level of frequency generation accuracy is better than an expected worst level of frequency generation accuracy.

15 Claims, 6 Drawing Sheets

INITIAL CELL SEARCH IN MOBILE COMMUNICATIONS SYSTEMS

BACKGROUND

The present invention relates to mobile communication systems, and more particularly to initial cell search techniques in mobile communication systems Mobile communication systems, such as cellular communication systems, allow mobile user equipment (UE) to communicate wirelessly by establishing a wireless (e.g., radio) link between the UE and one of a number of base stations (BS) which are geographically distributed throughout a service area. Mobility is provided by means of protocols that enable the UE to be handed off from a first BS to another as it moves from the coverage area of the first BS to the coverage area of the other BS.

The various base stations are connected (e.g., by means of wireless and/or wired links) to a public land mobile network (PLMN), which provides the necessary infrastructure for servicing calls. The PLMN also typically has connections to public switched telephone networks (PSTNs) to enable calls to be routed to wireline communication devices not associated with the PLMN.

Even when it is not actively engaged in a call, UE that has been switched on for a while typically "camps on" a control channel of a suitable base station. This enables the UE to be informed and to respond when it is the recipient of a call, and also enables the user to quickly initiate his or her own calls.

However, when the UE is first switched on, or when the network has been lost for a long time (e.g., when the UE has been out of a coverage area for a long time), the terminal must perform an initial cell search procedure to identify which cells (each associated with a base station) are available. The UE will select the best of the available cells that it finds from the search.

Because the UE might "wake up" essentially anywhere (e.g., in a country different from the one in which it was last switched on) the initial cell search typically involves searching for the presence of control channels throughout an entire available radiofrequency band. One hindrance in this respect is the fact that the accuracy of the UE's oscillator can vary, primarily due to temperature fluctuations of the frequency generating components. As long as the internal temperature is stable and nothing else happens that affects the frequency, the accuracy (and therefore also inaccuracy) of the generated frequency will be stable. Changes of the UE's internal temperature can be due to a change of activities in which the UE is engaged (e.g., the UE starting to receive or transmit data) and/or due to changes in the environment surrounding the UE.

Because of the possibility of varying frequency inaccuracy, the conventional initial cell search procedure must monitor not only the center frequencies of potential control channels within the available radiofrequency band, but must also monitor some number of frequencies on either side of the "desired" center frequencies, in case frequency inaccuracy causes there to be a wide disparity between the UE's generated frequency and the accurate frequency being used by a transmitting base station.

An example relating to the Wideband Code Division Multiple Access (WCDMA) standard of mobile communication will now be presented to illustrate a conventional initial cell search process. The invention to be presented herein should not be considered limited to use only in WCDMA systems, however, since it is equally applicable to other mobile communication systems as well.

A conventional initial cell search technique typically assumes that the frequency inaccuracy is large, on the order of about 10 parts per million (ppm) which means ±20 kHz on the 2 GHz band, when searching for carriers. A good level of accuracy in frequency generation makes coherent integration of the received signal possible, and thereby good performance. But, when frequency inaccuracy is large, the coherence in the receiver is deteriorated, and thereby so is the receiver's performance. This leads to a long search time being required.

To improve the search time, one approach involves using several searches with different center frequencies, where each of the searches assumes a better level of accuracy. For example, it is possible to compensate for a ±20 kHz inaccuracy by performing four searches, each assuming ±5 kHz inaccuracy. The searches are performed on the carriers $f_c=\pm 5$ kHz and $f_c=\pm 15$ kHz. This approach has a drawback in that it takes about four times as long as a single search with a frequency inaccuracy that is less than 5 kHz.

FIGS. 1a through 1c are flow charts that illustrate a conventional initial cell search algorithm that utilizes the just-described approach of searching multiple center frequencies on either side of the actual desired center frequency. The initial cell search procedure may be applied, for example, in the Universal Mobile Telecommunications System (UMTS). FIG. 1a illustrates an overview of the entire procedure. The goal of the search is to identify a carrier frequency that is being used by a cell associated with a target PLMN. To start out this search, an initial search list is put together that includes all valid UMTS Absolute Radio Frequency Channel Numbers (UARFCNs) (block 101).

One aspect of the approach is that discovering a cell on one center frequency may make it possible to eliminate other neighboring frequencies from a subsequent search, which has the effect of speeding up the overall search time. Accordingly, to increase the likelihood of finding a cell, the initial search procedure first performs a history list search (block 103). The history list may consist, for example, of some number (e.g., five, although this number is not essential) of most recent frequencies on which a suitable cell was found.

FIG. 1b is a flowchart of an exemplary history list search algorithm 103. In this example, the history list consists of some number of the most recent frequencies on which a suitable cell was found. As shown in block 121, the list is continuously updated each time a new PLMN/frequency is found. Upon deactivation/powering off of the UE, the history list is stored in a non-volatile memory for later use when the UE is again powered on.

To begin the actual searching, the first UARFCN in the history list is selected (block 123). Then a search loop is entered that runs a cell search on the selected UARFCN and removes the UARFCN from the initial search list (block 125). If a new cell is found, ("YES" path out of decision block 127), information received from the cell is used to determine whether it is from the target PLMN (decision block 129). If the cell is from the target PLMN ("YES" path out of decision block 129), then the search algorithm need not look further.

If, however, the found cell is not from the target PLMN ("NO" path out of decision block 129), all UARFCNs that are ±3 MHz from the UARFCN associated with the found cell are removed from the initial search list (block 130). Since removing these UARFCNs from the initial search list will prevent these carriers from being searched in later passes of the initial cell search, this has the effect of speeding up the overall search time.

Following block 130, or if a cell had not been found on the selected UARFCN ("NO" path out of decision block 127), a determination is made whether the last UARFCN in the history list had been selected (decision block 131). If not, ("NO" path out of decision block 131), the next UARFCN in the history list is selected (block 133), and the loop is repeated by returning processing to block 125. Determining that the last UARFCN in the history list had been selected ("YES" path out of decision block 131) constitutes the end of the history list search 103.

Returning to FIG. 1a, upon completion of the history list search, the next activity involves processing the downlink (DL) frequency band as follows.

First, the initial search list is reduced by filtering out frequencies based on their Received Signal Strength Indicators (RSSIs) (block 105). This filtering involves:

making an RSSI scan on each UARFCN in the initial search list;

for any of the frequencies that are ±100 kHz, ±300 kHz, ±500 kHz from the center frequencies in the DL frequency band, removing all UARFCNs from the initial search list that satisfy RSSI≦−100 dBm;

for any of the frequencies that are not
±100 kHz, ±300 kHz, ±500 kHz from the center frequencies in the DL frequency band, removing all UARFCNs from the initial search list that satisfy RSSI≦−95 dBm.

By removing frequencies that are not likely to result in a found cell, the searching effort is further reduced to testing only the most probable carriers in the band.

Finally, the resulting (filtered) list is searched 107. FIG. 1c is a flowchart illustrating an exemplary searcher 107. The approach taken is to search the most probable frequencies first, and then to search all other frequencies in the search list. Referring now to FIG. 1c, the center frequency to be used, $f_c$, is set equal to a carrier frequency in the DL frequency band (e.g., $f_c$=2112.5 MHz) and the UARFCN whose frequency is $f_c$−100 kHz is selected (block 141).

If the selected UARFCN is in the initial search list ("YES" path out of decision block 143), then a cell search is run on the selected UARFCN and the selected UARFCN is removed from the initial search list (block 145) in order to prevent if from being searched a second time. If the cell search found a new cell ("YES" path out of decision block 147), then information received from the cell is used to determine whether it is from the target PLMN (decision block 148). If it is ("YES" path out of decision block 148), then no further searching need be performed.

However, if the found cell is not from the target PLMN ("NO" path out of decision block 148), then all UARFCNs that are ±3 MHz from the selected UARFCN associated with the found cell are removed from the initial search list (block 149).

Following this, or if no new cell was found ("NO" path out of decision block 147) or if the selected UARFCN was not found to have been in the initial search list ("NO" path out of decision block 143), then an algorithm is performed that either selects a next UARFCN to be used in a subsequent pass of the loop, or else the initial search is terminated (block 151). To perform a next pass of the loop, processing returns to decision block 143.

The processing associated with block 151 (i.e., either selecting a next UARFCN to be used in a subsequent pass of the loop, or else terminating the initial search) can be performed in any of a number of ways. For example, carriers can be sorted in RSSI order (with strongest carriers appearing first) and searched in that sort order until all carriers have been selected for searching, at which point the initial search is terminated).

In one embodiment, the entire frequency band is divided up into a number of smaller frequency bands. For each of these smaller frequency bands, a known center frequency is selected, and then block 151 ensures that each of the carriers defined by $f_c$±100 kHz, $f_c$±300 kHz, and $f_c$±500 kHz is at some point selected for searching.

For more information about known initial cell search techniques, the interested reader is referred to US Pub. No. US 2004/0203839 A1, published on Oct. 14, 2004 (Ostberg et al., "Mobile Terminals and Methods for Performing Fast Initial Frequency Scans and Cell Searches").

One problem with the conventional initial cell search algorithm is that the search on all carriers takes a long time. In some cases it may take several minutes before it finds an allowable PLMN. One consequence this has on the UE is that time to registration to the network is long, which in turn means that the time from when the UE is first powered on until a call can be made is long. This negatively affects the user of the UE.

Another affect on the UE is that electric current consumption when the initial cell search algorithm is performed is high.

It is therefore desirable to provide initial cell search apparatuses and methods that are capable of more quickly identifying a cell associated with an allowable PLMN.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and machine readable storage media for performing an initial search for locating cells in a telecommunication system. The initial cell search includes defining a set of carrier frequencies to be searched, and selecting as a cell search mode either a wide cell search mode or a narrow cell search mode, wherein selecting the cell search mode is based on a level of frequency generation accuracy. The wide cell search mode searches a wider frequency range than the narrow cell search mode searches. For each carrier frequency in the set of carrier frequencies to be searched, a most-recently selected cell search mode is used when searching for a cell transmitting on the carrier frequency. The narrow cell search mode is used only when the level of frequency generation accuracy is better than an expected worst level of frequency generation accuracy.

In another aspect, the initial cell search includes initially selecting the wide cell search mode for use whenever searching for a cell transmitting on one of the carrier frequencies to be searched. When a cell is located as a result of performing a cell search on one of the carrier frequencies to be searched, a signal received from the located cell is used to improve the level of frequency generation accuracy. In response to improving the level of frequency generation accuracy, the narrow cell search mode is then selected for use when performing a next search for a cell transmitting on another one of the carrier frequencies to be searched.

In alternative embodiments, the initial cell search includes initially selecting one of the wide cell search mode and the narrow cell search mode for use whenever searching for a cell transmitting on one of the carrier frequencies to be searched, wherein the initial selection is based on one or more parameters that are indicative of a present level of frequency generation accuracy. When a cell is located as a result of performing a cell search on one of the carrier frequencies to be searched, a signal received from the located cell is used to improve the level of frequency generation accuracy. In response to improving the level of frequency generation accuracy, the narrow cell search mode is then selected for use when performing a next search for a cell transmitting on another one of the carrier frequencies to be searched.

In another aspect, the one or more parameters that are indicative of a present level of frequency generation accuracy include one or more automatic frequency control parameters.

BRIEF DESCRIPTION OF THE DRAWINGS

The objects and advantages of the invention will be understood by reading the following detailed description in conjunction with the drawings in which.

DETAILED DESCRIPTION

Figure 1A:
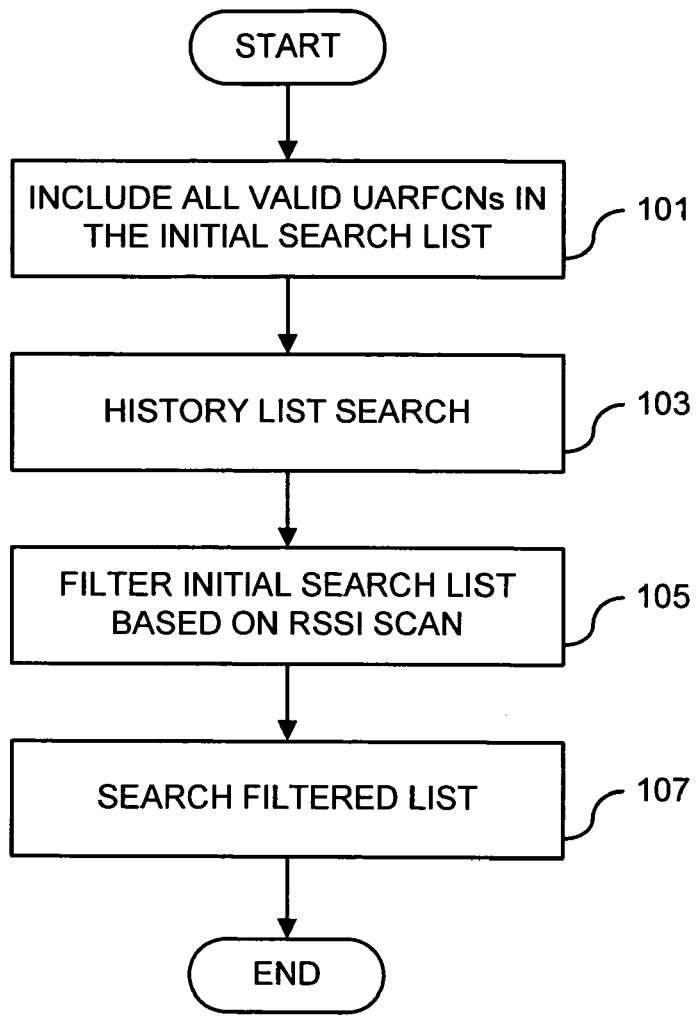
FIGS. 1a through 1c are flow charts that illustrate a conventional initial cell search algorithm.
Figure 1B:
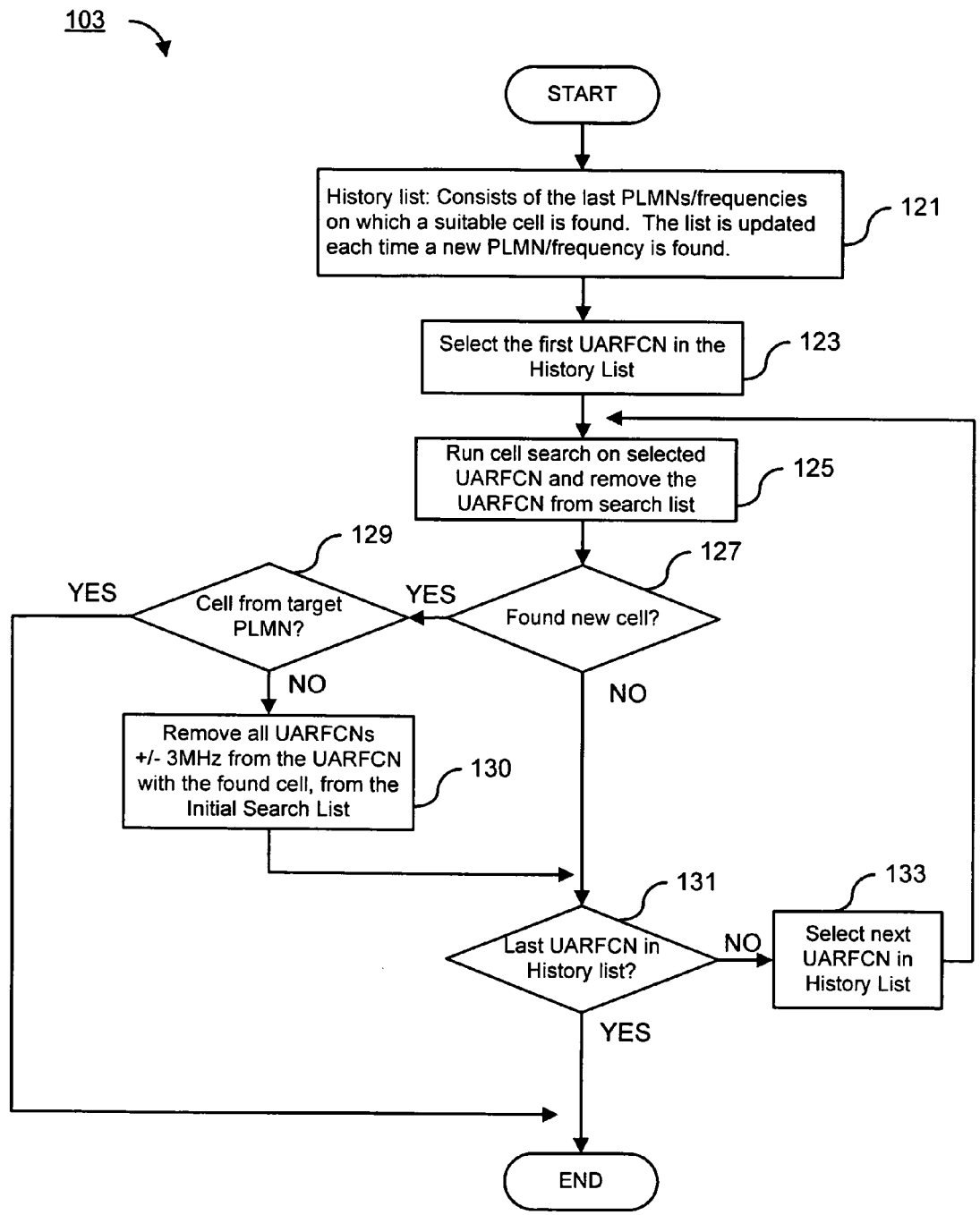
Figure 1C:
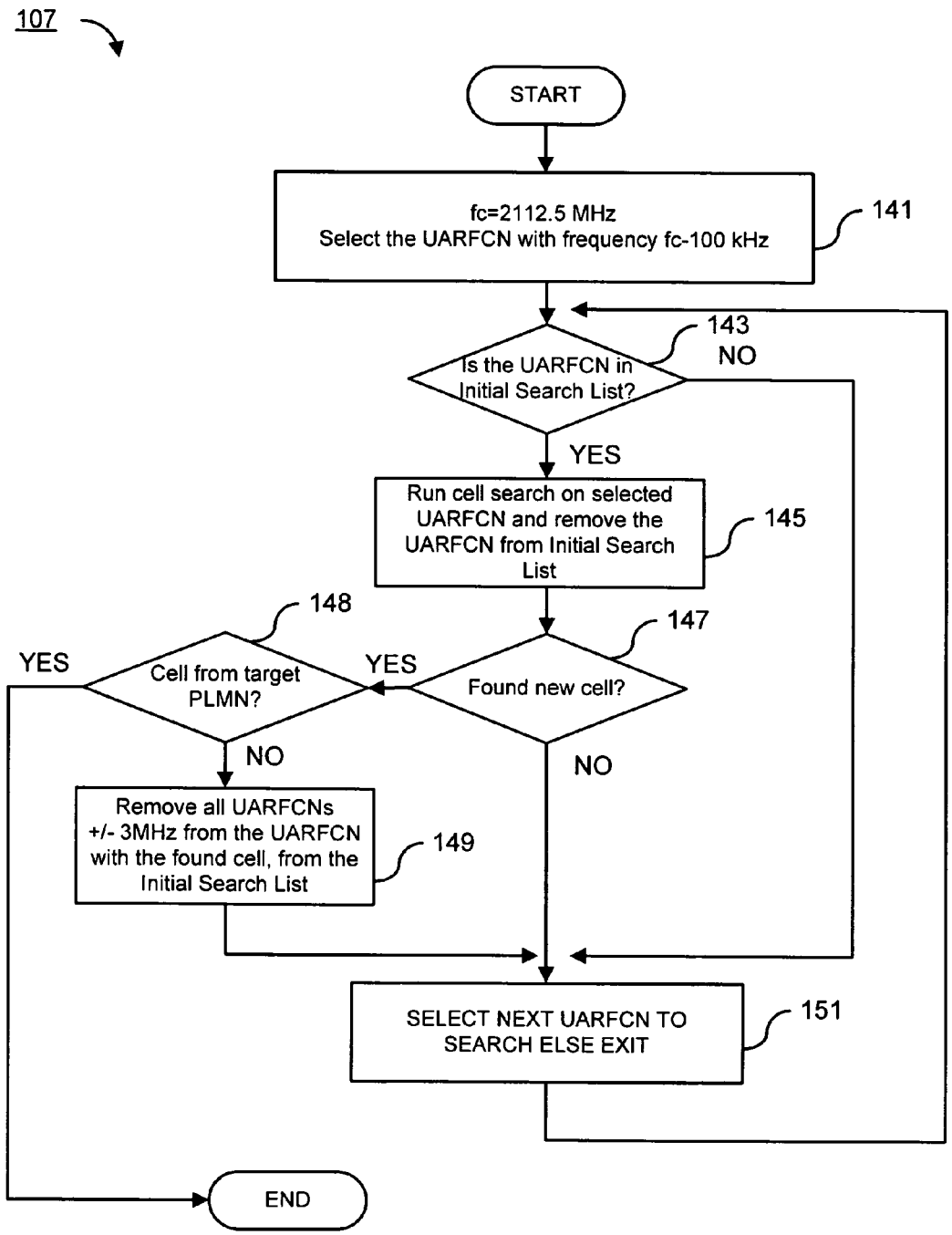

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

As explained in the Background section, the length of the initial cell search algorithm is directly related to the number of frequencies that have to be searched. In conventional techniques, the number of frequencies to be searched is set to a higher number than an ideal receiver would actually require because in practice, receivers are not ideal—they generate frequencies inaccurately. The accuracy of the UE's oscillator can vary, primarily due to temperature fluctuations of the frequency generating components. As long as the internal temperature is stable and nothing else happens that affects the frequency, the accuracy (and conversely, inaccuracy) of the generated frequency will be stable. Changes of the UE's internal temperature can be due to a change of activities in which the UE is engaged (e.g., the UE starting to receive or transmit data) and/or due to changes in the environment surrounding the UE.

In accordance with one aspect of the invention, information about the frequency inaccuracy in the UE is taken into account in the cell search procedure. When inaccuracy is known to be low, fewer frequencies are searched, thereby speeding up the search without detrimentally affecting the search results.

In another aspect of the invention, knowledge about frequency inaccuracy is inferred from the recent history of the UE's operation. For example, if the UE initially has but then loses a connection to the network by, for example, going out-of-coverage, the UE initially has accurate frequency generation. Therefore, a UE known to have recently gone out-of-coverage can be considered to still be generating relatively accurate frequencies, so the number of frequencies searched in a cell search operation can be reduced, thereby shortening the time spent searching for cells on each carrier and decreasing power consumption.

In yet another aspect of the invention, steps are taken during the cell search procedure to improve the frequency accuracy. Knowledge that the frequency accuracy has been improved is then used to shorten the cell search time. For example, consider an example in the context of WCDMA systems. (The invention is not limited to WCDMA systems.) When the UE is performing initial cell search and finds a cell, the UE reads the broadcast channel (BCH) to determine whether the cell is associated with the target PLMN and also to determine other cell information. If the cell belongs to a PLMN other than the one being searched for, or alternatively if the UE is not allowed to connect to the cell, the UE continues to search other carriers for cells associated with the target PLMN. In an aspect of the invention, when the UE reads the BCH it synchronizes its frequency generation After the UE has connected to a network in this manner, it has a very good estimate of the frequency, which will in many cases be valid for a relatively long time, depending on temperature changes and long term stability of the crystal oscillator. During this time the UE can continue to search the rest of the spectrum using a smaller frequency inaccuracy.

For example, by basing the cell search algorithm on a frequency inaccuracy equal to only a few kHz instead of, say, 10 ppm (e.g., 20 kHz in a 2 GHz band, as in conventional search algorithms), the cell search algorithm might be able to use only one cell search execution per carrier instead of four, thereby gaining a factor of 4 in the speed of the cell search. Even if the cell search algorithm has to perform two cell search executions per carrier, this still represents a speed improvement of a factor of 2.

Thus, due to better coherence in the receiver to the received signal, the UE can have the capability to:

1. Shorten the cell search time, and consequently decrease the time until the UE is connected to a network.
2. Improve sensitivity when searching for new cells, making it possible to find weaker cells in the same time that the conventional techniques require just to find the stronger ones. This application of the inventive techniques would reduce the risk of not finding a proper network.
3. Improve the UE's power consumption when it is out of coverage, since its activities would decrease.

An exemplary embodiment will now be described in connection with FIGS. 2a through 2d, which are flow charts that illustrate the new initial cell search algorithm. The initial cell search procedure may be applied, for example, in the Universal Mobile Telecommunications System (UMTS).

The new initial cell search algorithm employs two different kinds of cell searches: a "wide" cell search and a "narrow" cell search. The wide cell search is employed when frequency accuracy is not know to be good, and in this example involves, for each searched carrier, using 100 ms per frequency bin and 4 frequency bins per carrier. This is the kind of search performed in conventional systems. The narrow cell search in this example involves, for each searched carrier, using 100 ms per frequency bin and only one frequency bin (i.e., one search) per carrier. It will be recognized that in other (alternative) embodiments, the specific duration per bin and number of frequency bins that define the wide and narrow cell searches may differ. However, in each embodiment the wide cell search will involve more frequency bins then the narrow cell search (i.e., more searches) or expressed more generally, the wide cell search will involve searching in a wider frequency range than the narrow cell search, so that the wide cell search takes more time and/or energy than a narrow cell search.

In the logic flow to be presented, whether a wide cell search or a narrow cell search is performed is controlled by a parameter, "CS", which can take on values representing either "wide" or "narrow". The parameter CS is initially set to "wide", but is then changed to "narrow" whenever a cell from any PLMN is found. As explained earlier, the finding of any cell is used by the UE as an opportunity to improve its frequency accuracy. This improved frequency accuracy is then considered to be maintained for the duration of the remainder of the cell search algorithm.

Figure 2A:
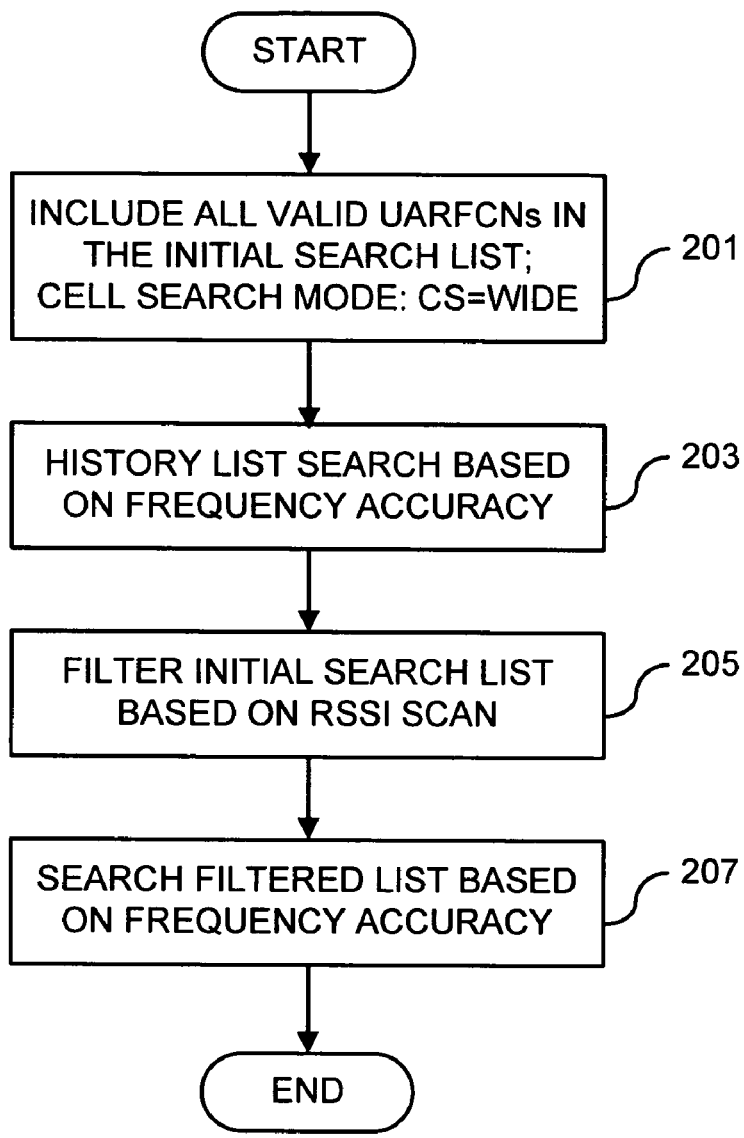
FIGS. 2a through 2c are flow charts that illustrate an improved initial cell search algorithm in accordance with the invention.

Turning now to a description of the exemplary embodiment, FIG. 2a illustrates an overview of the entire procedure. The goal of the search is to identify a carrier frequency that is being used by a cell associated with a target PLMN. To start out this search, an initial search list is put together that includes all valid UMTS Absolute Radio Frequency Channel Numbers (UARFCNs), and the parameter, CS, is initialized to "wide" (block 201).

One aspect of the approach is that discovering a cell on one center frequency may make it possible to eliminate other neighboring frequencies from a subsequent search, which has the effect of speeding up the overall search time. Accordingly, to increase the likelihood of finding a cell, the initial search procedure first performs a history list search based on frequency accuracy (block 203). The history list may consist, for example, of the five most recent frequencies on which a suitable cell was found.

Figure 2B:
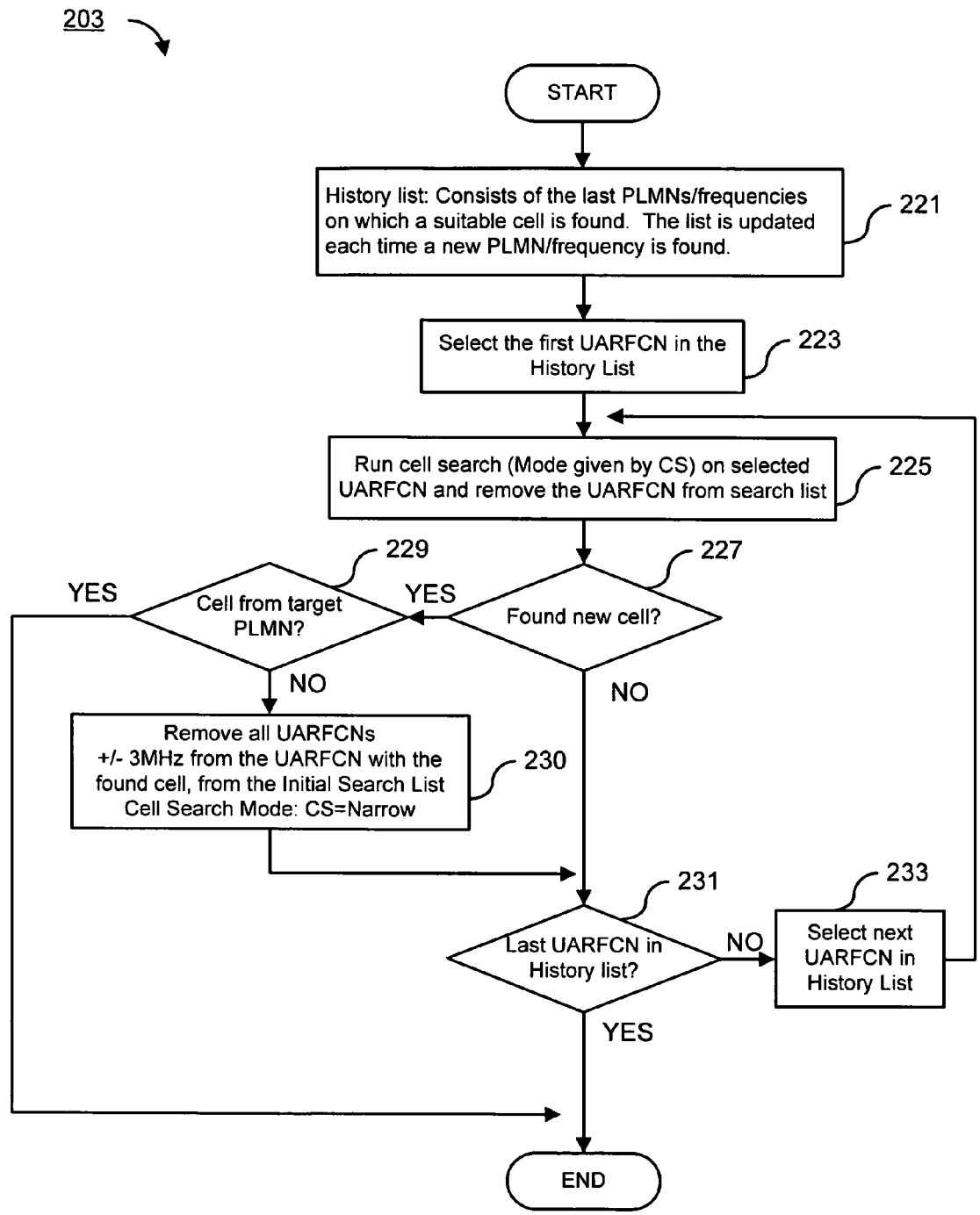

FIG. 2b is a flowchart of an exemplary embodiment of an improved history list search algorithm 203. In this example, the history list consists of a number of the most recent frequencies (e.g., five most recent frequencies) on which a suitable cell was found. As shown in block 221, the list is continuously updated each time a new PLMN/frequency is found. Upon deactivation/powering off of the UE, the history list is stored in a non-volatile memory for later use when the UE is again powered on.

To begin the actual searching, the first UARFCN in the history list is selected (block 223). Then a search loop is entered that runs a cell search (either a wide search or a narrow search, as controlled by the present state of the CS parameter) on the selected UARFCN and removes the UARFCN from the initial search list (block 225). If a new cell is found, ("YES" path out of decision block 227), information received from the cell is used to determine whether it is from the target PLMN (decision block 229). If the cell is from the target PLMN ("YES" path out of decision block 229), then the search algorithm need not look further.

If, however, the found cell is not from the target PLMN ("NO" path out of decision block 229), all UARFCNs that are ±3 MHz from the UARFCN associated with the found cell are removed from the initial search list (block 230). Since removing these UARFCNs from the initial search list will prevent these carriers from being searched in later passes of the initial cell search, this has the effect of speeding up the overall search time. In addition (also indicated in block 230), the UE takes advantage of its (temporary) connection to this cell by improving its frequency accuracy and setting the CS parameter equal to "narrow", thereby ensuring that all further cell searches will be narrow cell searches.

Following block 230, or if a cell had not been found on the selected UARFCN ("NO" path out of decision block 227), a determination is made whether the last UARFCN in the history list had been selected (decision block 231). If not, ("NO" path out of decision block 231), the next UARFCN in the history list is selected (block 233), and the loop is repeated by returning processing to block 225. Determining that the last UARFCN in the history list had been selected ("YES" path out of decision block 231) constitutes the end of the history list search 203.

Returning to FIG. 2a, upon completion of the history list search, the next activity involves processing the downlink (DL) frequency band as follows.

First, the initial search list is reduced by filtering out frequencies based on their Received Signal Strength Indicators (RSSIs) (block 205). In an exemplary embodiment, this filtering involves:
  making an RSSI scan on each UARFCN in the initial search list;
  for any of the frequencies that are ±100 kHz, ±300 kHz, ±500 kHz from the center frequencies in the DL frequency band, removing all UARFCNs from the initial search list that satisfy RSSI≦−100 dBm;
  for any of the frequencies that are not ±100 kHz, ±300 kHz, ±500 kHz from the center frequencies in the DL frequency band, removing all UARFCNs from the initial search list that satisfy RSSI≦−95 dBm.

By removing frequencies that are not likely to result in a found cell, the searching effort is further reduced to testing only the most probable carriers in the band.

Figure 2C:
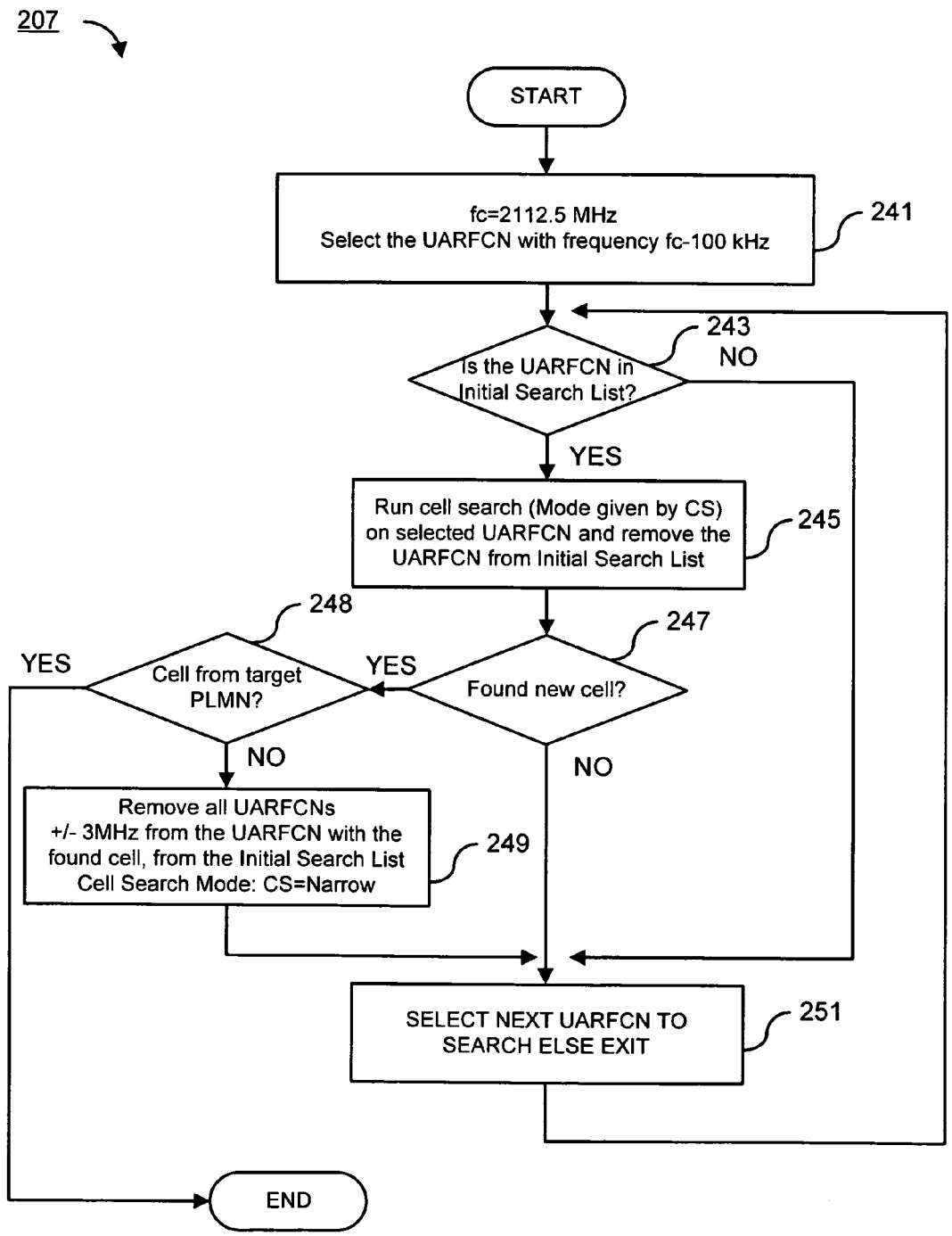

Finally, the resulting (filtered) list is searched 207. FIG. 2c is a flowchart illustrating an exemplary improved searcher 207. The approach taken is to search the most probable frequencies first, and then to search all other frequencies in the search list. Referring now to FIG. 2c, the center frequency to be used, $f_c$, is set equal to a carrier frequency in the DL frequency band (e.g., $f_c$=2112.5 MHz) and the UARFCN whose frequency is $f_c$−100 kHz is selected (block 241).

If the selected UARFCN is in the initial search list ("YES" path out of decision block 243), then a cell search is run on the selected UARFCN (either a wide search or a narrow search, as controlled by the present state of the CS parameter) and the selected UARFCN is removed from the initial search list (block 245) in order to prevent if from being searched a second time. If the cell search found a new cell ("YES" path out of decision block 247), then information received from the cell is used to determine whether it is from the target PLMN (decision block 248). If it is ("YES" path out of decision block 248), then no further searching need be performed.

However, if the found cell is not from the target PLMN ("NO" path out of decision block 248), then all UARFCNs that are ±3 MHz from the selected UARFCN associated with the found cell are removed from the initial search list (block 249). In addition (also indicated in block 249), the UE takes advantage of its (temporary) connection to this cell by improving its frequency accuracy and, based on now having a good level of frequency accuracy, ensuring that the CS parameter is set equal to "narrow", thereby ensuring that all further cell searches will be narrow cell searches.

Following this, or if no new cell was found ("NO" path out of decision block 247) or if the selected UARFCN was not found to have been in the initial search list ("NO" path out of decision block 243), then an algorithm is performed that either selects a next UARFCN to be used in a subsequent pass of the loop, or else the initial search is terminated (block 251). To perform a next pass of the loop, processing returns to decision block 243.

The processing associated with block 251 (i.e., either selecting a next UARFCN to be used in a subsequent pass of the loop, or else terminating the initial search) can be performed in any of a number of ways, none of which is essential to the invention. For example, carriers can be sorted in RSSI order (with strongest carriers appearing first) and searched in that sort order until all carriers have been selected for searching, at which point the initial search is terminated).

In one embodiment, the entire frequency band is divided up into a number of smaller frequency bands. For each of these smaller frequency bands, a known center frequency is selected, and then block 151 ensures that each of the carriers defined by $f_c \pm 100$ kHz, $f_c \pm 300$ kHz, and $f_c \pm 500$ kHz is at some point selected for searching.

It can be seen, then, that in the exemplary embodiment, as well as in other embodiments, the initial cell search algorithm dynamically selects either a wide cell search or a narrow cell search for selected frequencies as a function of the accuracy of the UE's frequency generation.

Also illustrated in the above described embodiment is an aspect in which the UE improves the accuracy of its frequency generation whenever it connects to a cell during the initial cell search algorithm, even if that cell is not associated with the target PLMN or is otherwise not one that the UE is allowed to access. Having improved the frequency generation accuracy, the UE then performs more efficient subsequent cell searches (each of which is performed on a selected carrier frequency) since it does not have to accommodate the possibility of low frequency generation accuracy.

In alternative embodiments, increased sensitivity when searching for weak cells while maintaining speed performance comparable to (or still less than) that of conventional initial cell search routines is possible by modifying the initial search list filtering performed by block 205 to not remove weaker cells that are otherwise filtered out in the exemplary embodiment described above. For example, the RSSI threshold levels that determine whether a particular UARFCN will be removed may be set to lower values to permit some number of weaker cells to remain in the initial search list. Perhaps the most straightforward way to search deep in a cell is to have essentially no threshold at all. For practical purposes, this is the same as having the threshold set at −100 dBm because that level is normally triggered by the internal noise of the receiver. To just look for strong cells, the threshold could be from −95 dBm up to −80 dBm or even higher. The particular threshold levels that should be selected are application dependent, and so cannot be set forth here definitively. Those skilled in the art will readily be able to determine suitable values for accomplishing their intended level of performance.

It will be observed that in the exemplary embodiment illustrated in FIGS. 2a-2c, the initial cell search algorithm is initialized so that the default search mode is to perform a wide (i.e., more time consuming) search, and to only switch to performing the more efficient narrow cell search after the UE's level of frequency generation accuracy has been improved (i.e., by using a received signal from a found cell to improve frequency generation). In still another set of alternative embodiments, however, the initial cell search mode is set based on some other parameter that is indicative of the UE's present level of frequency generation accuracy. For example, in some UEs, previously determined automatic frequency control (AFC) settings may be indicative of the present level of performance of the UE's frequency generator. Thus, these parameters may be used to determine whether the initial cell search algorithm will start out performing wide cell searches or narrow cell searches. Whether such an approach is suitable for use in a particular UE will depend on the UE's particular design and construction—in some cases, the frequency accuracy of a UE will change very rapidly when it is first turned on due to, for example, heating of one or more chips and other effects on the frequency generation. In such cases, initializing the CS parameter to indicate a wide cell search may be preferred.

An analysis of performance improvements that can be achieved using the new techniques described above will now be presented. The performance of the conventional cell search algorithm will be compared with that of an embodiment of the new cell search algorithm in connection with three different scenarios. In each scenario, it is assumed that both the conventional and the new techniques divide up the entire frequency band into a number of smaller frequency bands. For each of these smaller frequency bands, a known center frequency is selected, and then block 151 ensures that each of the carriers defined by $f_c \pm 100$ kHz, $f_c \pm 300$ kHz, and $f_c \pm 500$ kHz is at some point selected for searching.

In a first scenario, only three carriers are available for the UE to detect. These carriers are transmitted on some of the most probable carriers. The measured RSSI of all remaining frequencies is presumed to be below −100 dBm. The UE will be presumed to be looking for a PLMN that is not reachable (i.e., the initial cell search algorithm will not be terminated early due to finding an acceptable cell). It will further be assumed that the history list is empty.

Looking first at the conventional initial cell search algorithm, a search is started on the most probable carriers, ±100 kHz from the middle of the twelve 5 MHz channels in case the RSSI is larger than −95 dBm. This is true for only three of the 5 MHz channels. Cells are found in each of these three 5 MHz channels, and on average, the cell is found on the first carrier searched in 1.5 of the three channels. The remaining nine 5 MHz channels are not searched.

The algorithm also removes those carriers that lie ±3 MHz from the carriers with a found cell from the search. Since the RSSI measurement shows measured values out to about ±4.5 MHz from the received carrier, there may, in the worst case, be about 1.5 MHz on either side of the carriers in which a search will also be performed.

This means that in total, 4.5 carriers are searched from among the most probable carriers. Then an additional 7 carriers are searched on either side of each detected cell. Assuming 400 ms per search done 4 times per carrier (due to the wide search) plus approximately 1.5 s for reading BCH on each found carrier, the search will take, in the worst case:

$$0.4*4*4.5+0.4*4*7*2*3+3*1.5 \ s=7.2+67.2+4.5$$
$$s=78.9 \ s.$$

Now, taking a look at the performance of the new initial search algorithm under this first scenario, even if the UE does not decide to camp on a found cell, the following estimates for identifying the frequency carriers associated with cells is obtained: The frequency will be locked after a maximum of carriers. After that, a search will take 400 ms instead of 1600 ms because narrow cell searches will be performed instead of wide cell searches. The search order is the same as before.

Thus, using the new algorithm, a total of 4.5 carriers are searched from among the most probable carriers, and of these a wide search might be performed on 2 carriers. Then, an additional 7 carriers are searched on either side of each detected cell. Consequently, in the worst case the search will take:

$$0.4*4*2+0.4*2.5+0.4*7*2*3+3*1.5\ s=4.2+16.8+4.5$$
$$s=25.5\ s.$$

The new initial cell search algorithm shows a clear improvement over the conventional approach.

Consider now a second scenario in which there are only three carriers available for the UE to detect. Assume further that these three carriers are transmitted on some of the most probable carriers, and that the history list is empty. The measured RSSI is above −95 dBm for all other frequencies. The UE will be presumed to be looking for a PLMN that is not reachable (i.e., the initial cell search algorithm will not be terminated early due to finding an acceptable cell). These conditions can, for example, be valid for the 1900 MHz band but also due to nonlinearities in the receiver which leads to high RSSI levels for all frequencies in case the input signal from one carrier is very high. For the adjacent channel, it shall be 33 dB at a test point at −52 dBm, according to requirements. Even this leads to a RSSI level equal to −75 dBm on the adjacent channel. At higher input levels, where the linearity of the receiver is degraded, which means a level that is higher or approximately higher than −40 dBm, the RSSI level increases over the complete band. This may happen quite often in some environments where any operators have a micro cell, but a degradation where the RSSI level is greater than −95 dBm in a large part of the band is reasonable.

Considering the conventional initial cell search algorithm first, the search is started on the most probable carriers, ±100 kHz from the middle of the twelve 5 MHz channels in case the RSSI is larger than −95 dBm. This is true for all of the 5 MHz channels. In these twelve 5 MHz channels, cells are found on three of the channels, and on average a cell is found on the first carrier searched in 1.5 of these channels.

The carriers lying ±3 MHz from the carriers associated with a found cell are removed from the search. This means that 18 MHz (90 carriers) is excluded from the search after these three cells have been found. There then remains 277−90 carriers=187 carriers to search where there are no cells but the RSSI level is above the threshold.

This means that in total, 4.5 carriers close to the used carriers will be searched. In addition, 187 other carriers will be searched. Assuming 400 ms per search plus a BCH reading time of 1.5 s on each found carrier, this conventional search will take:

$$0.4*4*4.5+0.4*4*187+3*1.5\ s=18.6+4.5\ s=306.4\ s.$$

Turning now to the new initial cell search algorithm performing under this second scenario, the search is started on the most probable carriers (if they are defined). There are three carriers with detectable cells, so the UE searches between 1 and 10 5 MHz channels, which means between 1 and 20 carriers before it finds the first cell; this takes between 1.6 s and 20*1.6 s=32 s, which on average is about 16.8 s. Then, the rest of the 5 MHz channels are searched, which is between 2 and 11 5 MHz channels; this takes between 2*0.4 s and 11*0.4 s, which on average is about 2.6 s. After these searches, the algorithm goes on to search 187−9*2 carriers=169 carriers (not most probable).

This means that the total search will take $$16.8+2.6+0.4*169+3*1.5\ s=91.5\ s.$$

Again, the new initial cell search algorithm shows a clear improvement over the conventional technique.

Consider now a third scenario in which there are twelve carriers available for the UE to detect. Assume that they are transmitted on some of the most probable carriers and that the history list is empty. The measured RSSI is assumed to be above −95 dBm for all frequencies. The UE is assumed to be looking for a home PLMN that is not reachable.

Looking first at the conventional initial cell search algorithm, the search is started on the most probable carriers that are ±100 kHz from the middle of the twelve 5 MHz channels in case the RSSI is larger than −95 dBm. This is true for all of the 5 MHz channels. Cells are found on all of these twelve 5 MHz channels, and on average the cell is found on the first searched carrier on 6 of the channels; on the other channels a cell is found on the second search.

The carriers lying ±3 MHz from the carriers associated with a found cell are removed from the search list. this means that all other carriers will be excluded from the search.

Consequently, a total of 18 carriers are searched close to the used carriers. With four times 400 ms per search plus 1.5 s for BCH reading on each found carrier, the search can be estimated to take:

$$0.4*4*18+12*1.5\ s=28.8+18\ s=46.8\ s.$$

Considering now the expected performance of the new initial cell search algorithm operating under conditions defined by the third scenario, it can be seen that a total of 18 carriers will be searched close to the used carriers. The frequency is locked after a maximum of two carriers. Consequently, the search can be estimated to take:

$$0.4*4*2+0.4*16+12*1.5\ s=27.6\ s.$$

These estimates are summarized in the following table:

TABLE 1

Performance comparison between conventional and new initial cell search techniques.

|  | Conventional Algorithm | New Cell Search Algorithm |
| --- | --- | --- |
| Scenario 1 | 78.9 s | 25.5 s |
| Scenario 2 | 306.4 s | 91.5 s |
| Scenario 3 | 46.8 s | 27.6 s |

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of locating cells in a telecommunication system, comprising:
   defining a set of carrier frequencies to be searched;
   providing a wide cell search mode and a narrow cell search mode for use in a selection step;
   selecting as a cell search mode either the wide cell search mode or the narrow cell search mode, wherein selecting the cell search mode is based on a level of frequency generation accuracy of a local frequency generator in a mobile terminal;
   for each carrier frequency in the set of carrier frequencies to be searched, using a most-recently selected cell search mode when searching for a cell transmitting on the carrier frequency, wherein:
the wide cell search mode searches a wider frequency range than the narrow cell search mode searches;
the narrow cell search mode is used only when the level of frequency generation accuracy is better than an expected worst level of frequency generation accuracy;
the method is performed without prior knowledge of base station availability,
and wherein the method further comprises:
initially selecting one of the wide cell search mode and the narrow cell search mode for use whenever searching for a cell transmitting on one of the carrier frequencies to be searched, wherein the initial selection is based on one or more parameters that are indicative of a present level of frequency generation accuracy;
locating a cell as a result of performing a cell search on one of the carrier frequencies to be searched;
using a signal received from the located cell to improve the level of frequency generation accuracy; and
in response to improving the level of frequency generation accuracy, ensuring that the narrow cell search mode is selected for use when performing a next search for a cell transmitting on another one of the carrier frequencies to be searched.

2. The method of claim 1, comprising:
initially selecting the wide cell search mode for use whenever searching for a cell transmitting on one of the carrier frequencies to be searched;
locating a cell as a result of performing a cell search on one of the carrier frequencies to be searched;
using a signal received from the located cell to improve the level of frequency generation accuracy; and
in response to improving the level of frequency generation accuracy, selecting the narrow cell search mode for use when performing a next search for a cell transmitting on another one of the carrier frequencies to be searched.

3. The method of claim 1, comprising:
arranging an order in which carrier frequencies are to be searched based on an expected likelihood of locating a cell associated with each of the carrier frequencies.

4. The method of claim 3, wherein carrier frequencies known to have been most recently associated with a suitable cell are searched before other carrier frequencies in the set of carrier frequencies to be searched.

5. The method of claim 1, wherein the one or more parameters that are indicative of a present level of frequency generation accuracy include one or more automatic frequency control parameters.

6. An apparatus for locating cells in a telecommunication system, the apparatus comprising:
logic circuitry that defines a set of carrier frequencies to be searched;
logic circuitry that provides a wide cell search mode and a narrow cell search mode for use by logic that selects a cell search mode;
logic circuitry that selects as a cell search mode either the wide cell search mode or the narrow cell search mode, wherein selection of the cell search mode is based on a level of frequency generation accuracy of a local frequency generator in a mobile terminal;
logic circuitry that, for each carrier frequency in the set of carrier frequencies to be searched, uses a most-recently selected cell search mode when searching for a cell transmitting on the carrier frequency,
wherein:
the wide cell search mode searches a wider frequency range than the narrow cell search mode searches;
the narrow cell search mode is used only when the level of frequency generation accuracy is better than an expected worst level of frequency generation accuracy;
the apparatus operates without prior knowledge of base station availability,
wherein the apparatus further comprises:
logic circuitry that initially selects one of the wide cell search mode and the narrow cell search mode for use whenever searching for a cell transmitting on one of the carrier frequencies to be searched, wherein the initial selection is based on one or more parameters that are indicative of a present level of frequency generation accuracy;
logic circuitry that locates a cell as a result of performing a cell search on one of the carrier frequencies to be searched;
logic circuitry that uses a signal received from the located cell to improve the level of frequency generation accuracy; and
logic circuitry that, in response to improving the level of frequency generation accuracy, ensures that the narrow cell search mode is selected for use when performing a next search for a cell transmitting on another one of the carrier frequencies to be searched.

7. The apparatus of claim 6, comprising:
logic circuitry that initially selects the wide cell search mode for use whenever searching for a cell transmitting on one of the carrier frequencies to be searched;
logic circuitry that locates a cell as a result of performing a cell search on one of the carrier frequencies to be searched;
logic circuitry that uses a signal received from the located cell to improve the level of frequency generation accuracy; and
logic circuitry that, in response to improving the level of frequency generation accuracy, selects the narrow cell search mode for use when performing a next search for a cell transmitting on another one of the carrier frequencies to be searched.

8. The apparatus of claim 6, comprising:
logic circuitry that arranges an order in which carrier frequencies are to be searched based on an expected likelihood of locating a cell associated with each of the carrier frequencies.

9. The apparatus of claim 8, wherein carrier frequencies known to have been most recently associated with a suitable cell are searched before other carrier frequencies in the set of carrier frequencies to be searched.

10. The apparatus of claim 6, wherein the one or more parameters that are indicative of a present level of frequency generation accuracy include one or more automatic frequency control parameters.

11. A non-transitory machine readable storage medium having stored thereon a set of program instructions for causing a processor to locate cells in a telecommunication system, the set of program instructions comprising instructions that cause the processor to perform:
defining a set of carrier frequencies to be searched;
providing a wide cell search mode and a narrow cell search mode for use in a selection step;
selecting as a cell search mode either the wide cell search mode or the narrow cell search mode, wherein selecting the cell search mode is based on a level of frequency generation accuracy of a local frequency generator in a mobile terminal;

for each carrier frequency in the set of carrier frequencies to be searched, using a most-recently selected cell search mode when searching for a cell transmitting on the carrier frequency, wherein:

the wide cell search mode searches a wider frequency range than the narrow cell search mode searches;

the narrow cell search mode is used only when the level of frequency generation accuracy is better than an expected worst level of frequency generation accuracy;

the set of program instructions cause the processor to operate without prior knowledge of base station availability, wherein the instructions further cause the processor to perform:

initially selecting one of the wide cell search mode and the narrow cell search mode for use whenever searching for a cell transmitting on one of the carrier frequencies to be searched, wherein the initial selection is based on one or more parameters that are indicative of a present level of frequency generation accuracy;

locating a cell as a result of performing a cell search on one of the carrier frequencies to be searched;

using a signal received from the located cell to improve the level of frequency generation accuracy; and in response to improving the level of frequency generation accuracy, ensuring that the narrow cell search mode is selected for use when performing a next search for a cell transmitting on another one of the carrier frequencies to be searched.

12. The machine readable storage medium of claim 11, comprising instructions that cause the processor to perform:

initially selecting the wide cell search mode for use whenever searching for a cell transmitting on one of the carrier frequencies to be searched;

locating a cell as a result of performing a cell search on one of the carrier frequencies to be searched;

using a signal received from the located cell to improve the level of frequency generation accuracy; and in response to improving the level of frequency generation accuracy, selecting the narrow cell search mode for use when performing a next search for a cell transmitting on another one of the carrier frequencies to be searched.

13. The machine readable storage medium of claim 11, comprising instructions that cause the processor to perform:

arranging an order in which carrier frequencies are to be searched based on an expected likelihood of locating a cell associated with each of the carrier frequencies.

14. The machine readable storage medium of claim 13, wherein the set of program instructions cause the processor to perform searching carrier frequencies known to have been most recently associated with a suitable cell before searching other carrier frequencies in the set of carrier frequencies to be searched.

15. The machine readable storage medium of claim 11, wherein the one or more parameters that are indicative of a present level of frequency generation accuracy include one or more automatic frequency control parameters.

* * * * *

UNITED STATES PATENT AND TRADEMARK OFFICE
CERTIFICATE OF CORRECTION

PATENT NO. : 7,917,140 B2  Page 1 of 1
APPLICATION NO. : 11/005280
DATED : March 29, 2011
INVENTOR(S) : Palenius It is certified that error appears in the above-identified patent and that said Letters Patent is hereby corrected as shown below:

In Column 9, Line 21, delete "and $f_c$500 kHz" and insert -- and $f_c \pm 500$kHz --, therefor.

In Column 12, Line 16, delete "list. this" and insert -- list. This --, therefor.

Signed and Sealed this
Twenty-seventh Day of December, 2011

David J. Kappos
*Director of the United States Patent and Trademark Office*